(12) United States Patent
Hashizume et al.

(10) Patent No.: US 6,388,837 B1
(45) Date of Patent: May 14, 2002

(54) TAPE CARTRIDGE

(75) Inventors: Kenji Hashizume; Yukio Miyazaki; Shinichi Sato; Masatoshi Okamura, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/482,226

(22) Filed: Jan. 13, 2000

(30) Foreign Application Priority Data

Jan. 19, 1999 (JP) .......................................... 11-010494

(51) Int. Cl.[7] .............................................. G11B 23/02
(52) U.S. Cl. ...................................................... 360/132
(58) Field of Search ................................ 360/132, 131, 360/90, 96.5; 241/198; 242/338.1, 341, 347, 347.1, 347.2

(56) References Cited

U.S. PATENT DOCUMENTS

| 4,572,461 A | * | 2/1986 | Horikawa et al. | ........... 241/198 |
| 4,635,879 A | * | 1/1987 | Sumida et al. | .............. 242/198 |
| 4,644,433 A | * | 2/1987 | Horikawa et al. | ........... 360/132 |
| 4,676,453 A | * | 6/1987 | Komiyama et al. | ......... 242/199 |
| 4,678,138 A | * | 7/1987 | Nemoto | ...................... 242/198 |
| 4,697,702 A | * | 10/1987 | Urayama | ..................... 206/387 |
| 4,714,213 A | * | 12/1987 | Watanabe et al. | ........... 242/198 |
| 4,843,510 A | * | 6/1989 | Meguro et al. | ............. 360/132 |
| 4,881,137 A | * | 11/1989 | Meguro et al. | ............ 360/96.5 |
| 4,884,159 A | * | 11/1989 | Satoh | .......................... 360/132 |
| 5,075,812 A | | 12/1991 | Lee | ............................. 360/132 |

FOREIGN PATENT DOCUMENTS

| EP | 0323199 | 5/1989 |
| JP | 2-49031 | 12/1990 |

* cited by examiner

Primary Examiner—David Davis
(74) Attorney, Agent, or Firm—Wood, Phillips, VanSanten, Clark & Mortimer

(57) ABSTRACT

An improvement of a tape cartridge is characterized in that connecting plate parts having recesses, one for each, in the rear inner portions thereof facing the exposed tape portion. The recesses formed in the rear inner portions of the connecting plate parts are preferably bevels tapering rearwardly and outwardly, but they may take the form of steps instead.

3 Claims, 6 Drawing Sheets

TAPE CARTRIDGE

BACKGROUND OF THE INVENTION

1. Field of the Invention

This invention relates to tape cartridges for digital recording, such as digital data service (DDS) and digital audio tape (DAT), and other applications, and more particularly to tape cartridges of the type having brakes for hubs around which a tape is wound.

2. Prior Art

Tape cartridges in common use comprise housing made up of upper and lower half casings, a pair of hubs around which a length of tape is wound and which are turnably supported within the housing, said lower half casing having a pair of holes through which drive shafts of a recorder/reproducer are inserted to drive the hubs, a slider which slidably covers and uncovers the holes, said slider being disposed along the outer surface of the lower casing, and a hub brake having brake pawls adapted to be engaged with and disengaged from teeth provided around the hubs, said hub brake being disposed slidably within the cartridge housing. The hub brake slides to release its pawls out of engagement with the teeth, in an interlocked operation, when the front lid that covers the tape portion pulled out to the front of the upper and lower casings of the housing is turned open.

For example, Japanese Utility Model Application Kokoku No. 2-49031 discloses a cartridge housing made up of an upper half casing 1 and a lower half casing 2 as illustrated in FIG. 5, wherein a pair of hubs 3 around which a length of tape 4 is wound are turnably supported, said lower casing having a pair of holes through which driving shafts of a recorder/reproducer to drive the hubs 3 are to be inserted, a slider 7 which slidably covers or uncovers the holes is disposed along the outer surface of the lower casing 2, and a hub brake 8 is provided inside the cartridge so as to slide along the inner surface of the upper casing 1, said hub brake having brake pawls 81 adapted to engage teeth 31 formed around the hubs 3, in such manner that the pawls 81 of the hub brake 8 are released against the urging of a spring 9 as the brake is caused to slide in an interlocked operation with the opening of an openable front lid 10 which covers a portion of the tape 4 pulled out to the front of the housing.

The hub brake 8, with both ends bent at right angles, can slide along the both inner end surfaces of the upper and lower half casings 1, 2.

Tape cartridges of the type described above are in use for recording audio-frequency signals and data in general. Recent demand for larger and larger memory capacities for data storage has been met by reducing the thickness of tape or increasing the diameter of the tape wound up in a roll.

When such a cartridge is used, the tape roll is unwound to force an expose portion of it ahead at the front of the cartridge. With a large tape roll, it can occur that the tape portion being unwound from the roll is damaged by sliding contact with the inner surface of the hub brake.

This will be more fully explained below. Referring to FIG. 5, the hub brake 8 has a pair of connecting plate parts 83 at the left and right ends with which the brake can move back and forth along the inner walls of the upper and lower casings. The connecting plate parts 83 in turn have arms with projections 85 formed at their front ends, respectively. The hub brake 8 is activated as part of the front lid 10 presses the projections 85 when the lid is turned open and closed. In the arrangement described, the tape 4 that is partly pulled out to the front of the housing can sometimes come in contact with part of the connecting plate parts 83 of the hub brake 8 and be damaged by the sliding contact.

BRIEF SUMMARY OF THE INVENTION

The present invention solves the above problem in the following way. The invention provides an improvement of a tape cartridge which comprises a housing made up of upper and lower half casings, a pair of hubs around which a length of tape is wound and which are turnably supported within the housing, a freely openable front lid provided at the front of the housing to cover an exposed portion of the tape, and a hub brake having a pair of brake pawls adapted to be engaged with and disengaged from teeth provided around the hubs, said hub brake being disposed along the inner wall surface of the upper casing within the cartridge housing and normally urged toward the hubs by an elastic member. The invention is characterized in that the hub brake comprises a main face plate part having the brake pawls, connecting plate parts perpendicularly bent and extended downwardly from the left and right ends of the main face plate part, arms extending frontwardly from the lower ends of the connecting plate parts, and projections adapted to be engaged with part of the front lid when the lid is turned open, to force the arms frontwardly, said connecting plate parts having recesses, one for each, formed in the rear inner portions thereof facing the exposed tape portion.

The recesses formed in the rear inner portions of the connecting plate parts are preferably bevels tapering rearwardly and outwardly, but they may take the form of steps instead.

DESCRIPTION OF THE PREFERRED EMBODIMENTS

The invention will now be explained in detail with reference to FIGS. 1 to 4 illustrating an embodiment of the invention.

Figure 1:
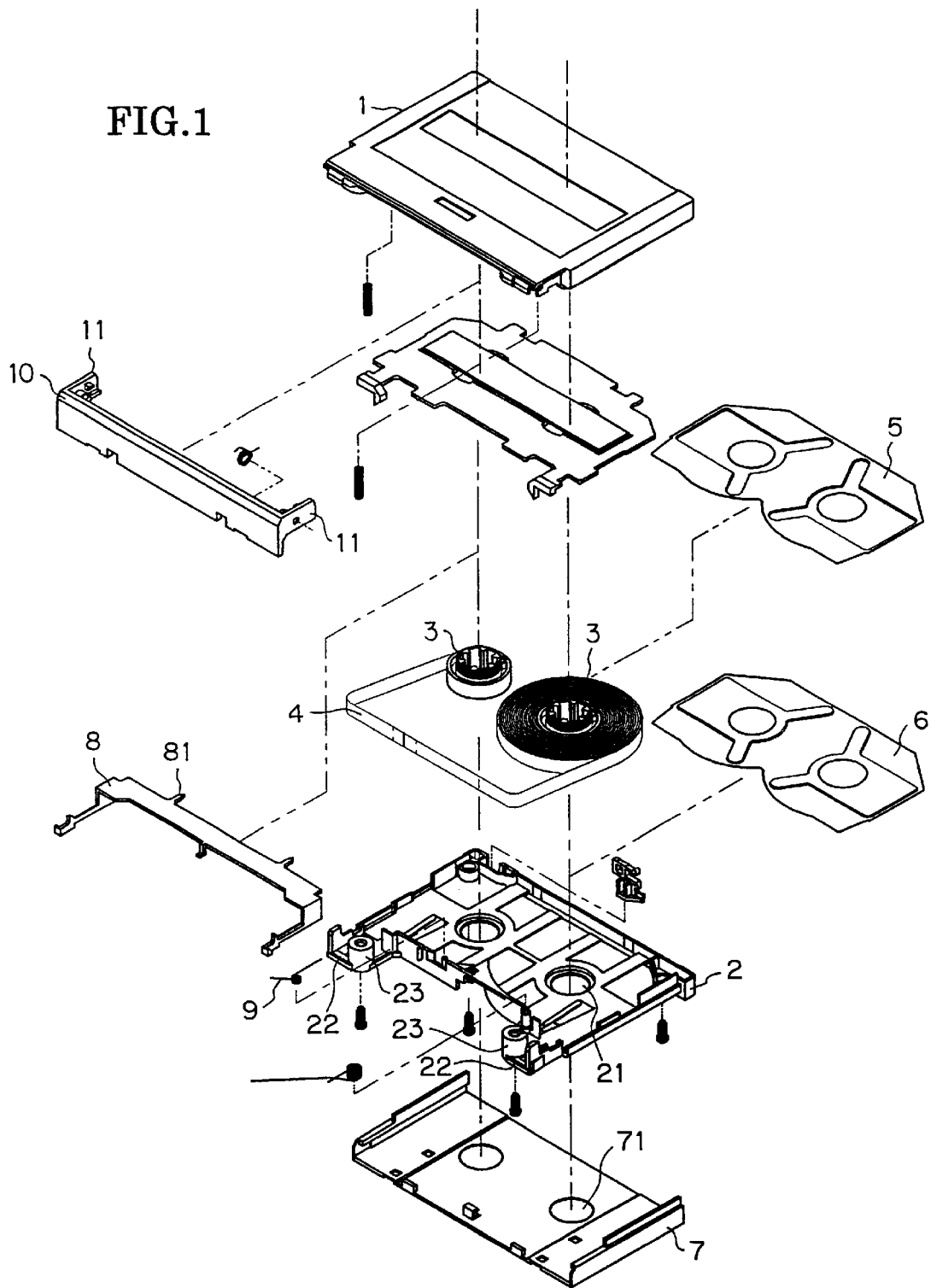
FIG. 1 is an exploded view of a tape cartridge embodying the present invention.
Figure 2:
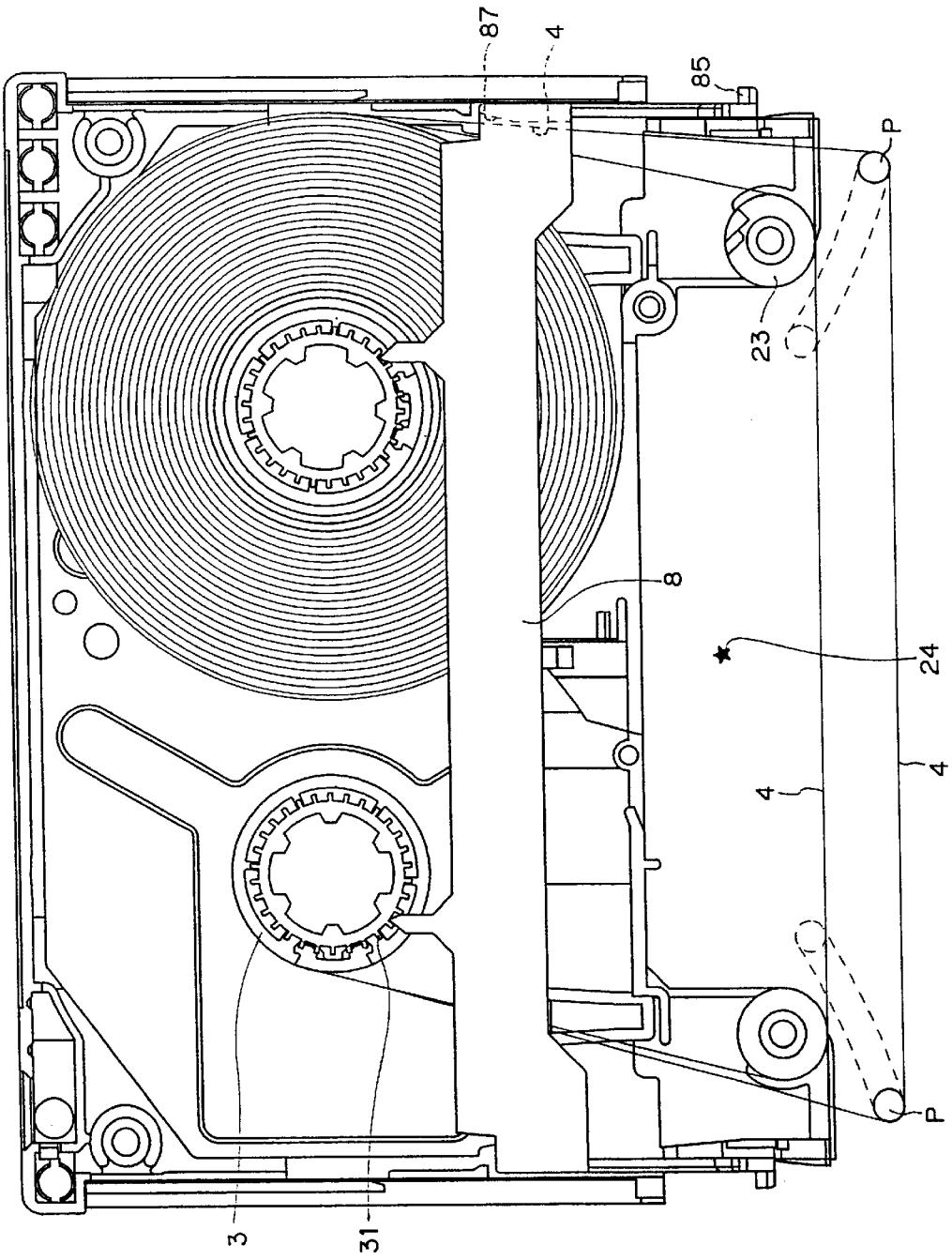
FIG. 2 is a plan view of the cartridge of the invention, with the upper casing and a lubricant sheet taken away.
Figure 3A:
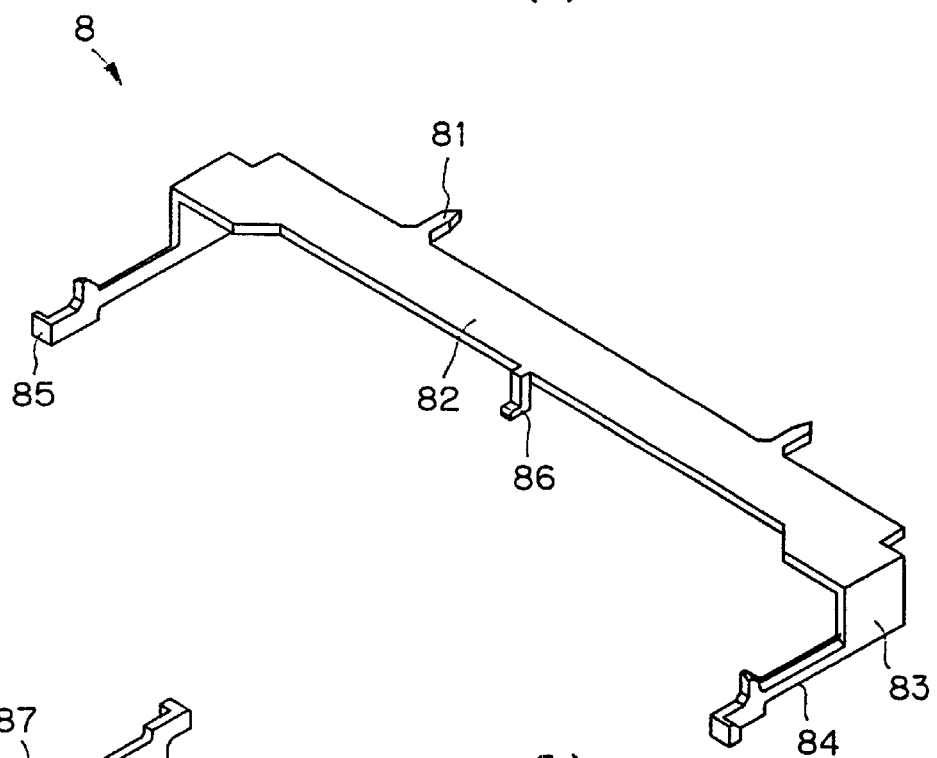
FIG. 3 shows, in perspective, the hub brake according to the invention as seen from above (a) and from below (b)
Figure 3B:
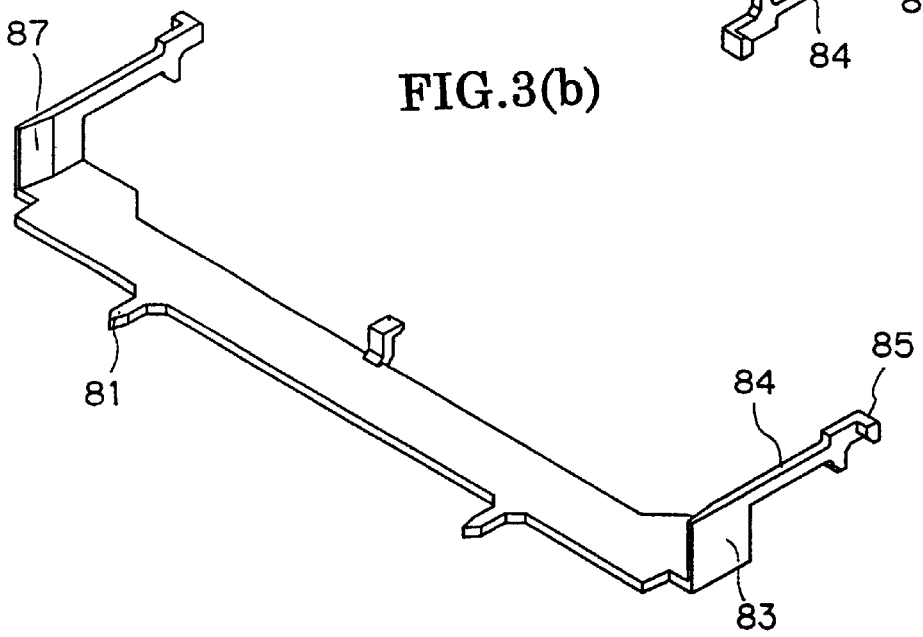
Figure 4:
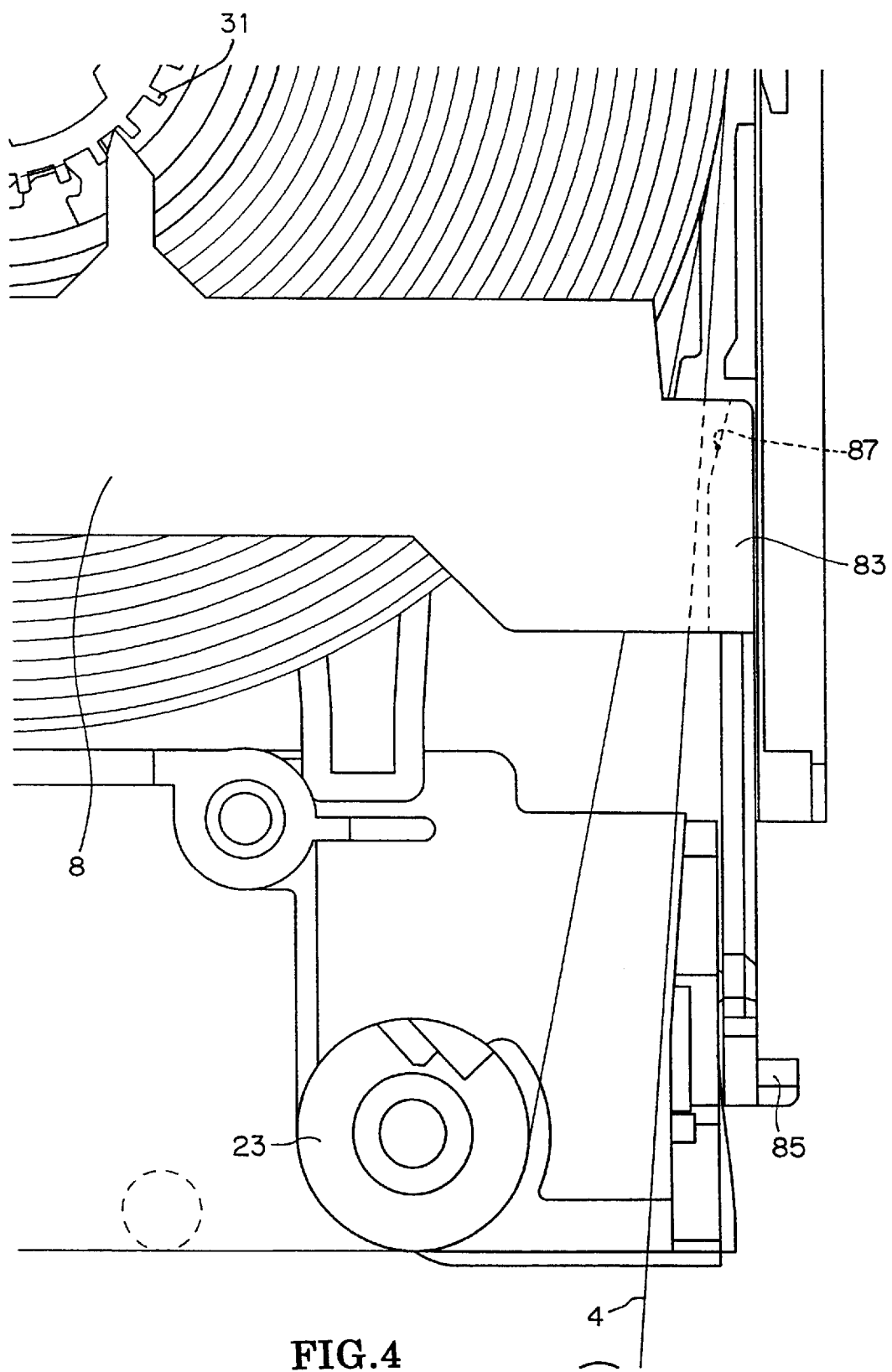
FIG. 4 is a fragmentary plan view, on an enlarged scale, of essential parts of the tape cartridge according to the invention, with the upper casing and lubricant sheets removed.
Figure 5:
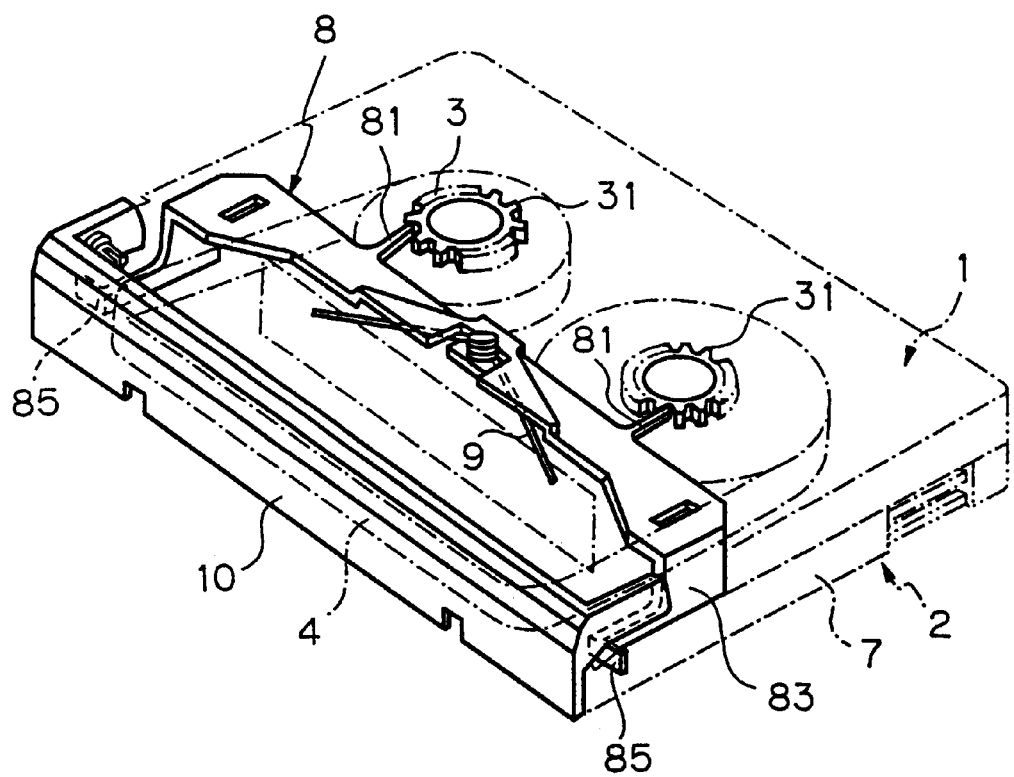
FIG. 5 is a perspective view of a conventional tape cartridge.

FIG. 1 is an overall exploded view of a tape cartridge embodying the invention. FIGS. 2 to 4 are explanatory views of essential parts of the invention. In FIGS. 2 and 4 lubricant sheets are omitted for a better understanding of the construction.

As illustrated in FIG. 1, the tape cartridge according to the present invention comprises a cartridge housing made up of an upper half casing 1 and a lower half casing 2, a pair of hubs 3 around which a tape 4 is wound and which are turnably supported within the housing, lubricant sheets 5, 6 placed above and below the hubs, said lower casing having a pair of holes 21 through which driving shafts of a recorder/reproducer to drive the hubs 3 are to be inserted, a slider 7 disposed along the outer surface of the lower casing 2 and made slidable to cover or uncover the holes, said slider 7 having a pair of holes 71 which are aligned with the holes 21 when the slider is slid backward to its open position to allow the insertion of the driving shafts, a hub brake 8 disposed between the inner wall of the upper casing and the lubricant sheet inside the cartridge, said hub brake having a pair of brake pawls 81 adapted to engage teeth 31 formed around the hubs 3, and springs 9 by which the hub brake is urged toward the hubs to prevent unwanted rotation of the hubs.

The tape 4 is partly extended between front openings 22, 22 at the front of the housing by means of tape guides 23, 23, and when the cartridge is not in use the tape portion 4 exposed outside the housing is covered by the front lid 10 and slider 7.

When starting the use of the cartridge, the slider 7 is first forced back by drive means on the recorder side, leaving a tape loading area 24 (FIG. 2) exposed. Then the front lid 10 opens. At this moment side lugs 11 of the front lid (FIG. 1) come in contact with the projections 85 at the ends of arms 84 of the hub brake 8 (FIG. 3), forcing the hub brake 8 frontward.

This releases the brake pawls 81 out of engagement with the teeth 31, setting the hubs 3 free to turn. Tape pull-out pins P (FIG. 2) of a recorder/reproducer then enter the tape loading area 24 and pull out a tape portion 3 to a predetermined position.

Figure 6:
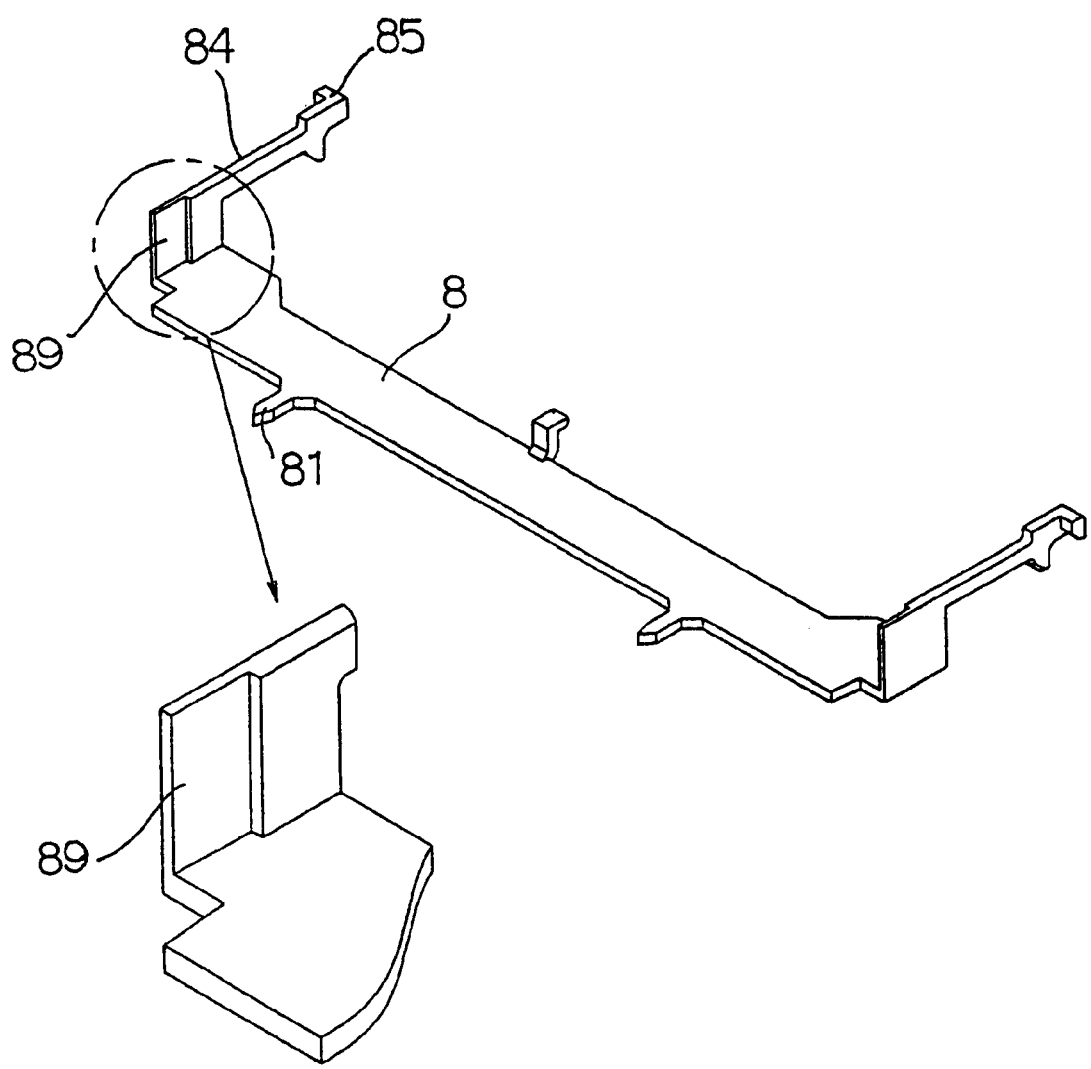
FIG. 6 is a perspective view similar to FIG. 3(b) showing a hub brake in another embodiment of the invention.

In accordance with the invention, as shown at (a) and (b) in FIG. 3, the hub brake 8 comprises a main face plate part 82, a pair of brake pawls protruding from the rear edge of the main face plate part 82 toward the hubs, connecting plate parts 83 perpendicularly bent and extended downwardly from the left and right ends of the main face plate part 82, arms 84 extending frontwardly from the lower ends of the connecting plate parts 83, and projections 85 formed at the front ends of the arms 84, the main face plate part 82 having a spring hook 86 formed in the middle to hold the spring in place. The inner rear portions of the both connecting plate parts 83 to face the tape 4 are beveled 87, tapering outwardly as indicated at (b) in FIG. 3. Although these portions are beveled in the embodiment being described, they have only to be recessed and may take other shapes, for example, steps 89 as shown in FIG. 6.

With the construction described above, the tape cartridge according to the present invention achieves the following effect. When the cartridge is used, the tape 4 is partly pulled out to the front of the housing by the pair of pins P.

In the case of a large roll of tape, the exposed tape portion comes close to the nearer connecting plate part 83 of the hub brake 8. However, the recess typified by a bevel 87 keeps the connecting plate part 83 and the tape portion 4 out of contact with each other. Even when that tape portion comes by chance into sliding contact with the connecting plate part 83, the bevel 87 protects the tape against damage.

What is claimed is:

1. A tape cartridge comprising a housing made up of upper and lower half casings, a pair of hubs around which a length of tape is wound and which are turnably supported within the housing, a freely openable front lid provided at the front of the housing to cover an exposed portion of the tape, and a hub brake having a pair of brake pawls adapted to be engaged with and disengaged from teeth provided around the hubs, said hub brake being disposed along the inner wall surface of the upper casing within the cartridge housing and normally urged toward the hubs by an elastic member, characterized in that said hub brake comprises a main face plate part having the brake pawls, connecting plate parts perpendicularly bent and extended downwardly from the left and right ends of the main face plate part, arms extending frontwardly from the lower ends of the connecting plate parts, and projections adapted to be engaged with part of the front lid when the lid is turned open, to force the arms frontwardly, said connecting plate parts having recesses, one for each, formed in the rear inner portions thereof facing the exposed tape portion.

2. The tape cartridge according to claim 1 characterized in that said recesses formed in the rear inner portions of said connecting plate parts are bevels tapering rearwardly and outwardly.

3. The tape cartridge according to claim 1 characterized in that said recesses formed in the rear inner portions of said connecting plate parts are steps.

* * * * *